US007899328B2

(12) United States Patent
 Krimmel

(10) Patent No.: US 7,899,328 B2
(45) Date of Patent: Mar. 1, 2011

(54) METHOD FOR OPERATING A MASSIVE OPTICAL NETWORK, OPTICAL LINE TERMINATION AND TRANSMISSION FRAME STRUCTURE

(75) Inventor: Heinz-Georg Krimmel, Korntal-Münchingen (DE)

(73) Assignee: Alcatel — Lucent, Paris (FR)

( * ) Notice: Subject to any disclaimer, the term of this patent is extended or adjusted under 35 U.S.C. 154(b) by 785 days.

(21) Appl. No.: 11/519,150

(22) Filed: Sep. 12, 2006

(65) Prior Publication Data

US 2007/0058974 A1 Mar. 15, 2007

(30) Foreign Application Priority Data

Sep. 13, 2005 (EP) .................................... 05291891

(51) Int. Cl.
 *H04J 14/00* (2006.01)
(52) U.S. Cl. ................ 398/66; 398/63; 398/67
(58) Field of Classification Search .............. 398/60, 398/63, 66, 67
 See application file for complete search history.

(56) References Cited

U.S. PATENT DOCUMENTS

| 5,559,624 | A | * | 9/1996 | Darcie et al. ............... 398/72 |
| 6,970,448 | B1 | * | 11/2005 | Sparrell et al. ............. 370/347 |
| 7,376,136 | B2 | * | 5/2008 | Song et al. .................. 370/392 |
| 2003/0020991 | A1 | * | 1/2003 | Chang ........................ 359/168 |
| 2004/0208631 | A1 | | 10/2004 | Song et al. |
| 2004/0218534 | A1 | * | 11/2004 | Song et al. ................. 370/236.2 |
| 2006/0133382 | A1 | * | 6/2006 | Yun et al. .................... 370/394 |

FOREIGN PATENT DOCUMENTS

| EP | 0 615 358 A1 | 9/1994 |
| WO | WO 2004/112264 A2 | 12/2004 |

* cited by examiner

*Primary Examiner* — Dzung D Tran
(74) *Attorney, Agent, or Firm* — Harness, Dickey & Pierce, P.L.C.

(57) ABSTRACT

A method for operating a passive optical network transmitting sub-frames of data arranged in a common transmission frame in at least two signalling modes from an optical line termination to a plurality of optical network units comprises the step of arranging first sub-frames of data to be transmitted in a first signalling mode which requires lower specifications of the optical network units ahead of second sub-frames of data to be transmitted in a second signalling mode which requires higher specifications of the optical network units. The invention is also realized in an optical line termination which comprises means for performing the method, a passive optical network equipped with such an optical line termination, and a corresponding transmission frame structure.

15 Claims, 1 Drawing Sheet

METHOD FOR OPERATING A MASSIVE OPTICAL NETWORK, OPTICAL LINE TERMINATION AND TRANSMISSION FRAME STRUCTURE

BACKGROUND OF THE INVENTION

The invention is based on a priority application EP 05291891.9 which is hereby incorporated by reference.

The invention relates to a method for operating a passive optical network which transmits sub-frames of data arranged in a common transmission frame in at least two signalling modes from an optical line termination to a plurality of optical network units, to an optical line termination with means for performing the method, to a passive optical network, and to a corresponding transmission frame structure.

A passive optical network (PON) with dynamic multi-level pulse amplitude modulation (PAM) generating a scheme of multi-level signalling modes (e.g. a binary level and a 4-level mode in downstream) basically transmits at a symbol rate of 12244 or 2488 MSymbols per second (MSps) continuously and switches the signalling mode dynamically in the sub-frames (or packets, respectively) for/from each optical network unit (ONU). Such a PON is commonly provided with a point-to-multipoint structure (tree structure), having an optical line termination (OLT) as a central station and a plurality (often several tens to thousands) of optical network units (ONUs) in downstream which may represent e.g. subscriber stations connected to the OLT via optical fiber lines.

The performance of such a PON can be increased by implementing new signalling modes with an increased number of levels (e.g. 8-level etc.). Although the OLT as a central station may be equipped with relatively small effort with suitable means for generating signals with more levels, due to the excessive number of ONUs in a PON, replacing all receivers which are not specified for processing higher-level signals (referred to as "legacy receivers" in the following) would cause immense costs. Although introduction of burst mode in downstream could be a workaround, if maintaining continuous operation is desired, adding new signalling modes with an increased number of levels must be performed in a downward compatible way, i.e. the transmission signal must contain signal sections which can be processed by the legacy receivers and higher-level sections which the legacy receivers must be able to tolerate without losing sync due to the variable length of those sections.

In the critical downstream path, such multi-level sections would still contain enough signal state transitions to keep the clock data recovery (CDR) of the legacy ONUs in lock. Average transition amplitude is indeed reduced but still sufficient to maintain CDR lock and even full swing transitions are present at a reduced probability. The CDR staying in lock allows ongoing bit-counting and navigation of frames in the transmission convergence (TC) layer even if for the 'legacy' ONUs not all data sections are readable.

A typical transmission frame of the TC-layer has often a pre-defined, constant length and consists of a header (physical control block downstream (PCBd)) and several concatenated GEM (Gigabit PON Encapsulation Method) sub-frames of variable length (referred to as GEM frames in the following). To assure continued synchronicity not only in the physical medium-dependent (PHY)-layer (e.g. CDR), but also in the TC layer, it is indispensable that the entire physical control block downstream is transmitted strictly as a 2-level section. For transmission of the subsequent GEM frames, the following approach is known from the state of the art:

The GEM frame headers are always transmitted in 2-level format in order that the GEM headers are readable also for the 'legacy' ONUs. Hence sync, HEC, port-ID and length indicators are readable to all ONUs, i.e. also to those having the lowest specification (2-level-only ONUs) which can discard in a qualified manner GEM frames not destined to them. This approach has the disadvantage that the signalling Mode (PAM-mode) has to be switched frequently between GEM headers and GEM payload sections.

SUMMARY OF THE INVENTION

It is the object of the invention to provide: a method for operating a passive optical network, an optical line termination, a passive optical network, and a transmission frame structure, all of which allow older ONUs to tolerate sub-frames of data transmitted in a signalling mode they are not specified for with less switching of signaling modes compared to the state of the art.

This object is achieved by a method for operating a passive optical network transmitting sub-frames of data arranged in a common transmission frame in at least two signalling modes from an optical line termination to a plurality of optical network units, comprising the step of arranging first sub-frames of data to be transmitted in a first signalling mode which requires lower specifications of the optical network units ahead of second sub-frames of data to be transmitted in a second signalling mode which requires higher specifications of the optical network units.

In this way the sub-frames of data, in particular of the GEM frame format (including GEM frame header) can be transmitted entirely in the mode specified by the capabilities of the recipient ONU and the link. The GEM frames having variable length, the difficulty is that the TC-layers of all ONUs require information about the start of subsequent GEM frames. According to the G.984 standard, a payload length indicator (PLI) is used as a pointer value in the GEM header, pointing to the start of the subsequent GEM frame. If this information is transmitted in a multi-level mode an individual ONU is not specified for, the consequence is a loss of sync (TC-layer) for that particular ONU. This is problematic only if e.g. a binary sub-frame of data follows a 4-level sub-frame of data, as an ONU which is specified to read binary level data only probably loses sync after the 4-level sub-frame and consequently cannot process the subsequent binary sub-frame without a preamble signal. Consequently, in the inventive method, the sub-frames of data are sorted according to their signalling level (binary, 4-level, 8-level etc.) and concatenated in a way that within a transmission frame no sub-frame of data of a lower-level signalling mode can follow a sub-frame of data with a higher-level signalling mode. Hence, earlier deployed receivers can ignore higher level signal segments in downstream without loosing sync on the TC layer. No overhead has to be spent to resynchronize the remote dumb receivers which do not understand the higher-level signal segments. Downstream preambles are not needed in this approach and their overhead is hence omitted. Also, excessive back and forth switching between signalling modes is avoided.

In a highly preferred variant, the common transmission frame is chosen to have a pre-defined frame length. Due to the constant frame-length, the lost receivers can immediately resynchronize to a subsequent transmission frame of the TC layer (also referred to as TC-frame), i.e. legacy-ONUs can recapture TC-layer and GEM sync immediately at the beginning of the next TC-frame (predictable by e.g. 19440 or 38880 Bytes equaling 155520 or 311040 bit interval durations after the previous TC frame start). This variant is particularly well adapted to the ITU-T standard for Gigabit PONs which defines a constant TC frame length and is supported by the conserved symbol-rate of the multi-level concept. Alternatively, a transmission frame with variable frame length may be used, as e.g. in Ethernet PONs (EPONs), the resynchronization between transmission frames in this case requiring the use of downstream preambles or suitable coding.

A preferred variant further comprises the step of transmitting at least one transmission frame from the optical line termination to the optical network units with a constant symbol rate, and transmitting each sub-frame of data entirely in the corresponding signalling mode. Continuously transmitting TC-frames with a constant length and bit-rate makes CDR simple, as time intervals between subsequent TC-frames at the ONUs are equal (e.g. 125 µs). Moreover, since all multi-level GEM segments are merged and jointly aligned to the end of the TC-frame as described above, it can be allowed that also the GEM headers are transmitted in the multi-level format.

In a highly preferred variant the signalling modes are defined by the number of levels of a pulse amplitude modulation, the levels representing the number of amplitude values which a transmitted symbol is mapped to. For instance, a 4-level PAM takes two bits at a time and maps the signal amplitude to one out of four possible levels.

The invention is also realized in an optical line termination being operable for transmitting sub-frames of data arranged in a common transmission frame to a plurality of optical network units in at least two signalling modes, comprising transmission frame generating means for generating a transmission frame by arranging first sub-frames of data to be transmitted in a first signalling mode requiring lower specifications of the optical network units ahead of second sub-frames of data to be transmitted in a second signalling mode requiring higher specifications of the optical network units. Such an optical line termination preferably further comprises switching means for dynamically switching the signalling modes when transmitting the sub-frames of data. In such a way, each sub-frame of data can be transmitted entirely in the signalling mode (2-level, 4-level etc.) specified by the capabilities of the recipient ONU and the link.

The invention is also realized in a passive optical network comprising an optical line termination as described above and a plurality of optical network units connected to the optical network termination via fiber links.

This allows multi-level signalling with a downward compatibility to ONUs specified only for processing data with lower level signalling modes.

The invention is also realized in a transmission frame structure for a passive optical network, comprising: a plurality of sub-frames of data, each to be transmitted in one of at least two signalling modes, wherein first sub-frames of data to be transmitted in a first signalling mode requiring lower specifications of optical network units of the passive optical network are arranged ahead of second sub-frames of data to be transmitted in a second signalling mode requiring higher specifications of optical network units of the passive optical network.

Preferably, the transmission frame structure further comprises a header structure to be transmitted in the signalling mode requiring the lowest specifications/capabilities of the optical network units. According to this concept the current general structure of a TC-frame with header/GEM-partition is expanded by an additional 'binary/m-level' cluster structure in the GEM partition conserving the downward compatibility to legacy ONUs.

In a highly preferred embodiment, the header structure contains a signal complexity map indicating positions in the transmission frame structure at which the signalling modes are to be switched. In this way, those ONUs which are capable of processing sub-frames of higher signalling modes may anticipate the switching and prepare their processing devices accordingly.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE DRAWINGS

Figure 1:
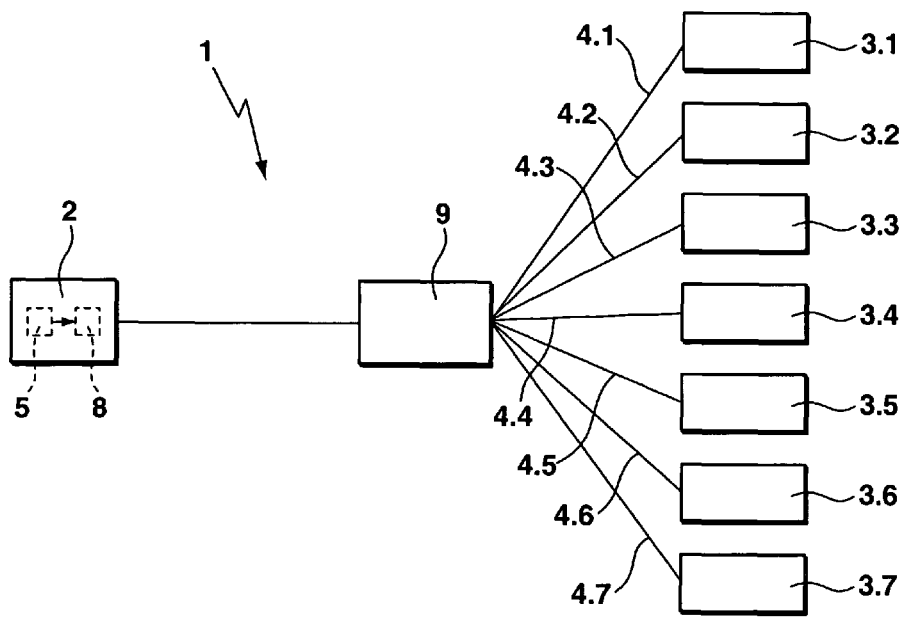
FIG. 1 shows a schematic diagram of an embodiment of a passive optical network according to the invention.

FIG. 1 shows a schematic diagram of a passive optical network (PON) 1 with an optical line termination (OLT) 2 which is connected directly to a 1×N passive optical distribution network (ODN) 9, itself being connected to a plurality of optical network units (ONUs) 3.1 to 3.7 via corresponding fiber lines 4.1 to 4.7, thereby constructing a distribution topology of the PON 1 having a point-to-multipoint structure. The PON 1 uses mixed-mode data transmission, such that data in downstream (i.e. from the OLT 2 to the ONUs 3.1 to 3.7) is transmitted in a continuous signalling format, and data in upstream (from the ONUs 3.1 to 3.7 to the OLT 2) is transmitted in burst-mode format. Gigabit-per-second PONs such as the PON 1 have been standardized to comprise a physical medium dependent layer (PHY) which performs e.g. clock data recovery (CDR) and a transmission convergence (TC) layer which defines frame and sub-frame structures for the data to be transmitted, the following discussion being focused on the latter.

The OLT 2 supports three signaling modes, namely a binary level, 4-level and 8-level signalling mode of a pulse amplitude modulation (PAM). The OLT 2 further comprises switching means 8 for dynamically switching between the signaling modes when necessary, so that each data section can be transmitted according to the specified signalling mode.

The first and second ONUs 3.1 and 3.2 are specified for processing data in the binary level mode only, the third and fourth ONUs 3.3 and 3.4 for processing data in the binary and 4-level modes, and the remaining ONUs 3.5 to 3.7 are capable of processing signals in all three signalling modes. The ONT 1 transmits the same signal to all of the ONUs 3.1 to 3.7, each of which selects the portions of the signal (sub-frames of data 7.1 to 7.7, described in greater detail in connection with FIG. 2 below) which are destined to it. As not all of the ONUs 3.1 to 3.7 are capable of processing those sub-frames transmitted by the OLT 1 in a mode requiring higher specifications (e.g. the 8-level mode), it must be ensured that these ONUs 3.1, 3.2 do not lose synchronicity due to the variable length of the sub-frames. In other words, the transmission format of the OLT 2 must be chosen in a downward compatible way, allowing the ONUs 3.1 to 3.4 having lower specifications to receive and process all sub-frames of data which are destined to them.

Figure 2:
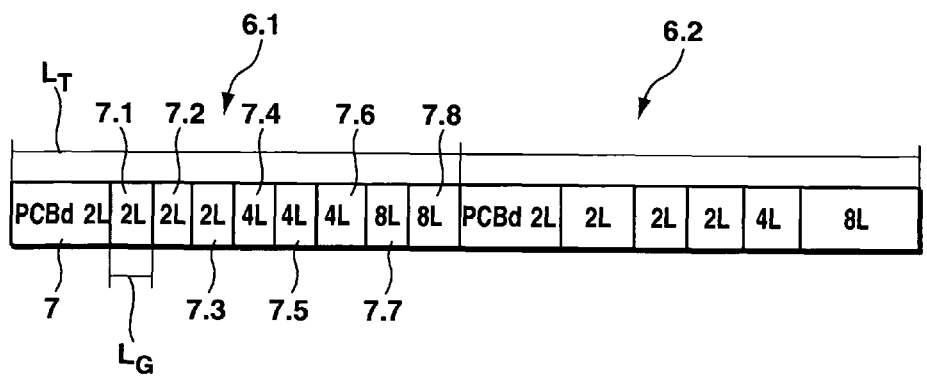
FIG. 2 shows two subsequent transmission frame structures according to the invention, each with a plurality of sub-frames of data.

For generating such transmissions, the OLT 2 has a transmission frame generating means 5 generating a concatenation of transmission frame structures of constant length $L_T$, also referred to as TC-frames in the following, two of which 6.1, 6.2 are shown in FIG. 2. As the PON 1 is construed according to the ITU-T standard, it has a constant symbol rate (bit-rate) in downstream transmissions, such that each transmission frame 6.1, 6.2 is transmitted with a constant duration (125 □s). Consequently, each of the ONUs 3.1 to 3.7 is capable of synchronizing to the start of e.g. the second transmission frame 6.2, as it is predictable by a length of typically 19440 or 38880 Bytes equaling 155520 or 311040 bit durations after the start of the previous transmission frame 6.1. As all of the ONUs 3.1 to 3.7 can synchronize at the level of the transmission frames 6.1, 6.2, the problem which remains to be solved resides in generating a sub-frame structure of the transmission frames 6.1, 6.2 such that it is guaranteed that each of the ONUs 3.1 to 3.7 can read and process all the sub-frames of data 7.1 to 7.8 in the transmission frame 6.1 which are destined to it.

The sub-frames of data 7.1 to 7.8 in the present case are GEM (GPON encapsulation format) frames (including a GEM frame header) which are transmitted entirely in the mode specified by the capabilities of the recipient ONU and the link. The difficulty here is that for synchronization purposes the TC-layers of all ONUs need to know the PLI pointer value included in the GEM-header, which points to the start of the subsequent. GEM frame. If this pointer is transmitted in a multi-level mode the consequence is a loss of sync (in the TC-layer) for the 'legacy' ONUs not meeting the specifications required for reading the higher signal format. This is problematic only if e.g. a binary segment is following a 4-level segment before the TC-frame ends.

Consequently, the transmission frame 6.1 as shown in FIG. 2 has a structure which avoids the above-mentioned problem. The structure starts with a header 7 also referred to as physical control block downstream (PCBd) which is transmitted strictly in the 2-level signalling mode for assuring continued synchronicity not only in the physical layer (for CDR), but also in the TC layer. The header 7 is followed by first sub-frames of data 7.1 to 7.3 which are to be transmitted in a first (2-level) signalling mode 2L which requires the lowest specifications met by all of the ONUs 3.1 to 3.7. The first sub-frames of data 7.1 to 7.3 are arranged ahead of second sub-frames of data 7.4 to 7.6 to be transmitted in a second (4-level) signalling mode 4L which requires higher specifications/capabilities which are only met by the ONUs 3.3 to 3.7, followed by third sub-frames of data 7.7, 7.8 transmitted in a third (8-level) signalling mode 8L which requires the highest specifications only met by the ONUs 3.5 to 3.7. All sub-frames of data 7.1 to 7.8 comprise a pointer value in the GEM header which represents the sub-frame length which normally differs from sub-frame to sub-frame, only the sub-frame length $L_G$ of the first sub-frame of data 7.1 being represented in FIG. 2 for the sake of simplicity. Needless to say, although the PON 1 is operable with three signaling modes only, the concept described above may also be applied to a PON operable with an different number of signalling modes, e.g. two or four.

By first sorting the sub-frames of data according to their signalling level (e.g. binary, 4-level, 8-level) and providing the transmission frame 6.1 with the above described structure, it is guaranteed that no sub-frame of data with a lower (e.g. binary level) signalling mode can follow after a sub-frame of data with a higher (e.g. 4-level resp. 8-level) signalling mode. Through such an ordering of sub-frames, even when e.g. the ONUs 3.1 and 3.2 lose sub-frame sync since they are unable to process the second sub-frames of data 7.4 to 7.6, no further sub-frames of data being destined to the ONUs 3.1 and 3.2 are present in the remaining first transmission frame 6.1, such that no data sub-frames are lost. The ONUs 3.1 and 3.2 are immediately back in-sync at the beginning of the second transmission frame 6.2, which has the same ordering of first, second and third sub-frames of data as the first transmission frame 6.1, only with a smaller number of sub-frames which have a greater sub-frame length.

Hence, the transmission frame structures 6.1, 6.2 as shown in FIG. 2 differ from the TC-frames of the state of the art by the further sectoring into level sections compiling signals of equal signal complexity. Moreover, the header 7 may contain a signal complexity map (not shown) indicating positions in the transmission frame 6.1 at which the signalling modes are to be switched, e.g. between sub-frames 7.3 and 7.4, thus allowing to give those of the ONUs 3.1 to 3.7 which are capable of performing the switching sufficient time for preparation.

The standard general structure with a header and a GEM-partition is expanded by an additional structure of binary/m-level clustering conserving downward compatibility to older ONUs. By using the transmission frame structure described above, it can be allowed that the entire sub-frames of data (including the GEM headers which contain the PLI value representing the sub-frame length) are transmitted in a multi-level format, such that transmitting the GEM headers of 4-level or 8-level sub-frames in the 2-level format leading to a high level of switching between PAM modes can be avoided. Also, downstream preambles are not needed in this approach and their overhead is hence omitted.

Obviously, the invention is not restricted to the GPON as described above, but may also advantageously applied in other passive optical networks with a different standard, such as BPONs, and also to standards not having constant transmission frame length $L_T$, such as EPONs.

The invention claimed is:

1. A method for operating a passive optical network, the method comprising:
    transmitting sub-frames of data arranged in a first common transmission frame in a plurality of signaling modes from an optical line termination to a plurality of optical network units, wherein
        the sub-frames of data to be transmitted in the first common transmission frame from a lowest level signaling mode of the plurality of signaling modes to a highest level signaling mode of the plurality of signaling modes, the lowest level being less than the highest level, and
        the plurality of signaling modes is defined by the number of levels of pulse amplitude modulation.

2. The method according to claim 1, wherein the first common transmission frame has a constant frame length.

3. The method according to claim 2, further comprising:
    second transmitting a second common transmission frame with a same symbol rate of the first common transmission frame from the optical line termination to the optical network units.

4. The method according to claim 1, wherein the transmitting transmits a header in the first common transmission frame for the lowest level signaling mode.

5. The method according to claim 4, wherein the transmitting transmits the header only for the lowest level signaling mode.

6. The method according to claim 4, wherein the transmitting transmits the header, the header including a signal complexity map indicating positions in the first common transmission frame at which the plurality of signaling modes are to be switched.

7. An optical line termination comprising:
    transmission frame generating means for generating a common transmission frame by arranging sub-frames of data to be transmitted in a plurality of signaling modes from a lowest level signaling mode of the plurality of signaling modes to a highest level signaling mode of the plurality of signaling modes, the lowest level being less than the highest level, and the transmission frame generating means is configured to transmit the sub-frames of data in the common transmission frame, wherein
        the plurality of signaling modes is defined by the number of levels of pulse amplitude modulation.

8. The optical line termination according to claim 7, further comprising:
    switching means for dynamically switching the plurality of signaling modes when transmitting the sub-frames of data.

9. A passive optical network comprising:
    an optical line termination according to claim 7; and
    a plurality of optical network units connected to the optical line termination via fiber links.

10. The optical line termination according to claim 7, wherein the transmission frame generating means is configured to transmit a header in the first common transmission frame for the lowest level signaling mode.

11. The optical line termination according to claim 10, wherein the transmission frame generating means is configured to transmit the header only for the lowest level signaling mode.

12. The optical line termination according to claim 10, wherein the transmission frame generating means is configured to transmit the header, the header including a signal complexity map indicating positions in the common transmission frame at which the plurality of signaling modes are to be switched.

13. A transmission frame structure for a passive optical network, comprising:
    a plurality of sub-frames of data configured to be transmitted in one of at least a plurality signaling modes, wherein the plurality of sub-frames of data to be transmitted are arranged from a lowest level signaling mode of the plurality of signaling modes to a highest level signaling mode of the plurality of signaling modes, the lowest level being less than the highest level, wherein
        the plurality of signaling modes is defined by the number of levels of pulse amplitude modulation.

14. The transmission frame structure according to claim 13, further comprising:
    a header structure to be transmitted in the lowest level signaling mode.

15. The transmission frame structure according to claim 14, wherein the header structure includes a signal complexity map indicating positions in the transmission frame structure at which the plurality of signaling modes are to be switched.

* * * * *